United States Patent
Shimomura et al.

(10) Patent No.: US 10,334,115 B2
(45) Date of Patent: Jun. 25, 2019

(54) MULTIPLE DWELLING HOUSE INTERPHONE SYSTEM

(71) Applicant: Aiphone Co., Ltd., Nagoya (JP)

(72) Inventors: Yuuta Shimomura, Nagoya (JP); Akira Kai, Nagoya (JP)

(73) Assignee: Aiphone Co., Ltd., Nagoya-Shi (JP)

( * ) Notice: Subject to any disclaimer, the term of this patent is extended or adjusted under 35 U.S.C. 154(b) by 0 days.

(21) Appl. No.: 16/008,363

(22) Filed: Jun. 14, 2018

(65) Prior Publication Data

US 2018/0295243 A1 Oct. 11, 2018

Related U.S. Application Data

(63) Continuation of application No. PCT/JP2016/052356, filed on Jan. 27, 2016.

(51) Int. Cl.
| | |
|---|---|
| H04M 1/00 | (2006.01) |
| H04M 11/02 | (2006.01) |
| H04M 9/00 | (2006.01) |
| H04M 9/02 | (2006.01) |

(52) U.S. Cl.
CPC ........... H04M 11/025 (2013.01); H04M 9/00 (2013.01); H04M 9/02 (2013.01)

(58) Field of Classification Search
CPC ... G07C 1/10; G07C 1/20; G07C 1/32; G07C 2009/00777; G07C 2009/62
USPC .......... 379/156, 159, 160, 164, 166, 167.01, 379/167.02, 167.05, 167.07, 167.08, 379/167.12, 167.14, 167.15, 168, 171, 379/172, 173, 167.03, 167.04
See application file for complete search history.

(56) References Cited

U.S. PATENT DOCUMENTS

| | | | | |
|---|---|---|---|---|
| 4,581,634 A | * | 4/1986 | Williams | ........... G07C 9/00079 |
| | | | | 348/156 |
| 9,060,074 B2 | * | 6/2015 | Wagner | ................ H04M 11/025 |
| 2004/0243812 A1 | * | 12/2004 | Yui | ........................... G07C 1/10 |
| | | | | 713/182 |

FOREIGN PATENT DOCUMENTS

| | | |
|---|---|---|
| JP | 2000-069186 A1 | 3/2000 |
| JP | 2006-041812 A1 | 2/2006 |

(Continued)

OTHER PUBLICATIONS

P2004-120173A (Apr. 15, 2004), Document with Translation.*

(Continued)

*Primary Examiner* — Binh Kien Tieu
(74) *Attorney, Agent, or Firm* — Burr & Brown, PLLC

(57) ABSTRACT

A multiple dwelling house interphone system includes a centralized collective entrance machine for a visitor to call a dweller of any building, a dwelling unit master device provided to each dwelling unit for a dweller to respond to a call, and a centralized controller which controls communication between the centralized collective entrance machine and each dwelling unit master device. Each dwelling unit master device has an ID storage section storing its own ID. When the ID of the dwelling unit master device is inputted for calling the dweller, a centralized collective entrance machine control section of the centralized collective entrance machine first transmits an ID confirmation request signal to all the dwelling unit master devices and waits for a reply from the corresponding dwelling unit master device, and next, transmits a call signal to the dwelling unit master device that has returned a reply signal.

3 Claims, 2 Drawing Sheets

(56) References Cited

FOREIGN PATENT DOCUMENTS

JP   2007-013671 A1   1/2007
JP   2015-080191 A1   4/2015

OTHER PUBLICATIONS

P2003-274025A (Sep. 26, 2003), Document with Translation.*
International Search Report and Written Opinion (Application No. PCT/JP2016/052356) dated Mar. 1, 2016.

* cited by examiner

MULTIPLE DWELLING HOUSE INTERPHONE SYSTEM

This application is a Continuation of International Application No. PCT/JP2016/052356, filed on Jan. 27, 2016.

BACKGROUND OF INVENTION

Technical Field

The disclosure relates to a multiple dwelling house interphone system that enables a visitor to call a dweller and speak with the dweller, in a multiple dwelling house.

Background Art

Conventionally, a large-scale multiple dwelling house constituted of a plurality of buildings has a multiple dwelling house interphone system. The multiple dwelling house interphone system includes a building collective entrance machine which is provided for each building and configured to call a dweller in the building by input of a dwelling unit number, and in addition, a centralized collective entrance machine which is configured to, by input of a building number and a dwelling unit number, select a building and a dwelling unit from the entire multiple dwelling house and call a dweller (see, for example, Japanese Laid-Open Patent Publication No. 2007-13671).

SUMMARY OF THE INVENTION

In order to enable calling by input of a building number and a dwelling unit number, the centralized collective entrance machine in the system for the conventional large-scale multiple dwelling house as described above needs to store dwelling unit numbers and building numbers to which dwelling unit master devices at calling destinations belong. Therefore, in a large-scale multiple dwelling house constituted of a plurality of buildings, since there are a large number of dwelling units, the amount of data to be stored is also large, and a large-capacity ROM for the storage and a high-performance CPU for processing a large amount of data in a short time are needed, leading to cost increase. In addition, a CPU and a ROM used for a widespread multiple dwelling house interphone system for medium scale cannot be used, and thus utilization development is impossible.

The disclosure has an object to provide a multiple dwelling house interphone system that enables calling without registering dwelling unit numbers and building numbers to which dwelling unit master devices at calling destinations belong, even in a case of providing a centralized collective entrance machine that enables calling for a dweller of any building, in a large-scale multiple dwelling house constituted of a plurality of buildings.

In order to attain the aforementioned object, a first aspect of the disclosure is a multiple dwelling house interphone system including a centralized collective entrance machine provided for a visitor to call a dweller of any building in a multiple dwelling house constituted of a plurality of buildings, a dwelling unit master device provided to each of dwelling units for a dweller to respond to a call from the centralized collective entrance machine, and a centralized controller configured to control communication between the centralized collective entrance machine and each dwelling unit master device. Each dwelling unit master device stores an own ID, and the centralized collective entrance machine includes a calling control section. The calling control section is configured to, when an operation of inputting the ID is performed for calling a dweller, first transmit an ID confirmation request signal to all the dwelling unit master devices and wait for a reply from the corresponding dwelling unit master device, and then, transmit a call signal to the dwelling unit master device that has replied, so as to perform calling.

With the above configuration, calling for a visit destination dweller is performed by input of the ID of the dwelling unit master device from the centralized collective entrance machine. Therefore, it becomes unnecessary to provide, to the centralized collective entrance machine or the centralized controller, a calling table in which the dwelling unit master devices are associated with the building numbers and the dwelling unit numbers. Thus, it becomes unnecessary to provide a large-scale ROM or a high-function CPU.

According to a second aspect of the disclosure, in the configuration as described in the first aspect, at an entrance of each building of the multiple dwelling house, a building collective entrance machine for calling a dweller in the building may be provided, and a building controller configured to control communication between the building collective entrance machine and each dwelling unit master device may be provided. The building collective entrance machine or the building controller has a calling table in which the IDs and dwelling unit numbers of the dwelling unit master devices are associated with each other. The building collective entrance machine allows calling to be performed by input of each dwelling unit number, and the building controller has a speech path monitoring section configured to monitor the ID confirmation request signal transmitted from the centralized collective entrance machine. When the dwelling unit master device having the corresponding ID exists in the building that the building controller manages, and a corresponding speech path is in use, the speech path monitoring section notifies the centralized collective entrance machine that the dwelling unit master device to be called exists.

With the above configuration, even when the ID confirmation request signal has been successfully transmitted to the dwelling unit master device to be called, in the case where there is no speech path available, the centralized collective entrance machine can notify the visitor that the dweller to be called is present but cannot be called at present. Therefore, the visitor can avoid becoming anxious even if the dweller cannot be called. In addition, calling is performed through a simple operation of inputting a dwelling unit number from the building collective entrance machine, and this is convenient for visitors.

According to a third aspect of the disclosure, in the configuration as described in the second aspect, the building controller may have a dwelling unit master device monitoring section configured to monitor the call signal transmitted from the centralized collective entrance machine. Even when a dwelling unit number of a calling destination exists in the building that the building controller manages, in the case where the dwelling unit master device to be called is in a busy state, the dwelling unit master device monitoring section notifies the centralized collective entrance machine of the busy state, and the calling control section of the centralized collective entrance machine notified of the busy state performs report of the busy state.

With the above configuration, in the case where the dwelling unit master device to which the call signal is transmitted is in a busy state, the centralized collective entrance machine reports this fact. Thus, the visitor can recognize the situation and can avoid becoming anxious.

According to a fourth aspect of the disclosure, in the configuration as described in the first aspect, at an entrance of each building of the multiple dwelling house, a building collective entrance machine for calling a dweller in the building may be provided, and a building controller configured to control communication between the building collective entrance machine and each dwelling unit master device may be provided. The building collective entrance machine or the building controller has a calling table in which the IDs and dwelling unit numbers of the dwelling unit master devices are associated with each other. The building collective entrance machine allows calling to be performed by input of each dwelling unit number, the building controller has a dwelling unit master device monitoring section configured to monitor the call signal transmitted from the centralized collective entrance machine. Even when a dwelling unit number of a calling destination exists in the building that the building controller manages, in the case where the dwelling unit master device to be called is in a busy state, the dwelling unit master device monitoring section notifies the centralized collective entrance machine of the busy state, and the calling control section of the centralized collective entrance machine notified of the busy state performs report of the busy state.

With the above configuration, when the dwelling unit master device to which the call signal is transmitted is in a busy state, the centralized collective entrance machine reports this fact. Thus, the visitor can recognize the situation and can avoid becoming anxious. In addition, calling is performed through a simple operation of inputting a dwelling unit number from the building collective entrance machine, and this is convenient for visitors.

According to the disclosure, calling for a visit destination dweller is performed by input of the ID of the dwelling unit master device from the centralized collective entrance machine. Therefore, it becomes unnecessary to provide, to the centralized collective entrance machine or the centralized controller, a calling table in which the dwelling unit master devices are associated with the building numbers and the dwelling unit numbers. Thus, it becomes unnecessary to provide a large-scale ROM or a high-function CPU.

DESCRIPTION OF EMBODIMENTS

Figure 1:
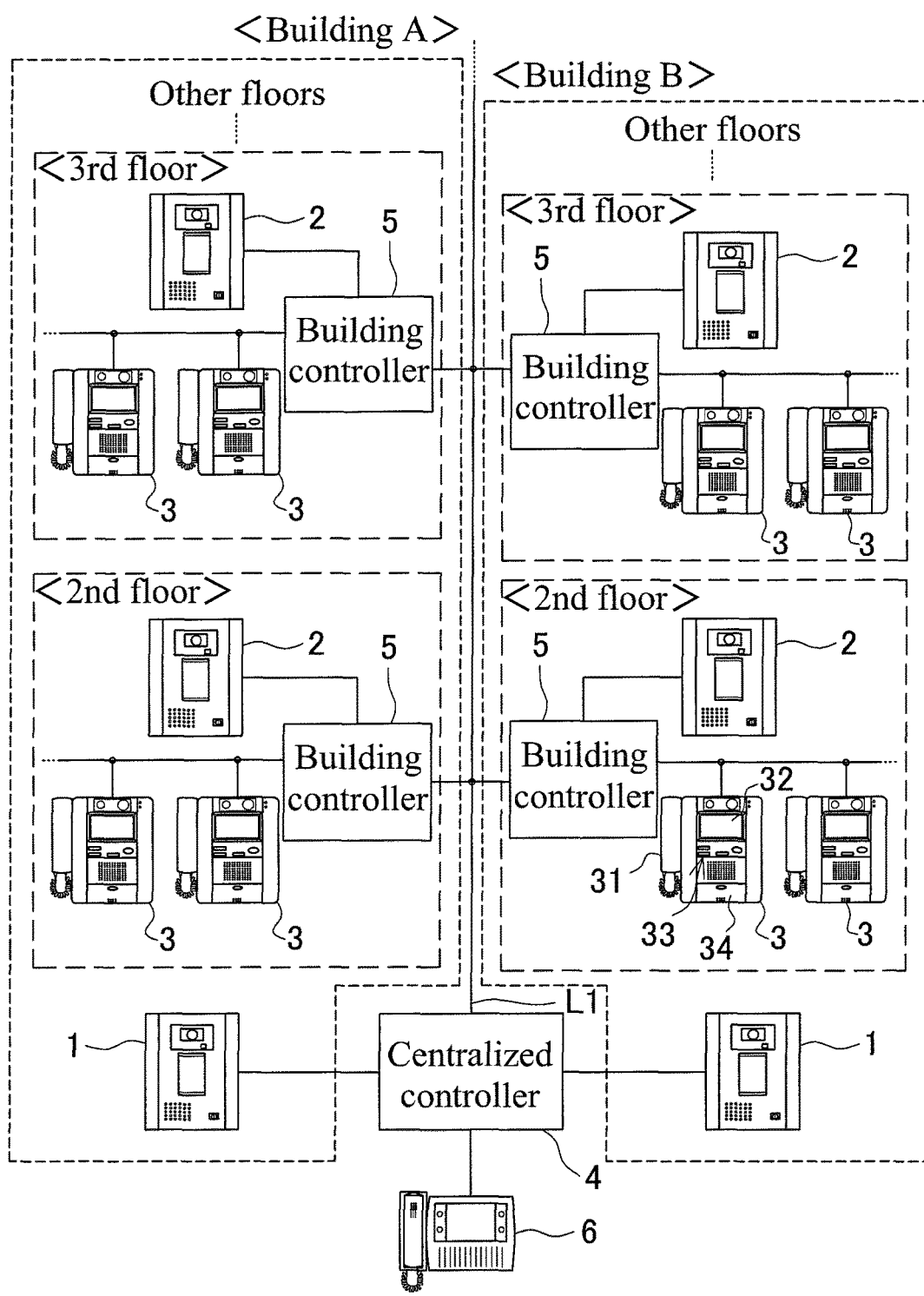
FIG. 1 is a configuration diagram showing an example of a multiple dwelling house interphone system according to the disclosure.

Hereinafter, embodiments in which the disclosure is embodied will be described in detail with reference to the drawings. FIG. 1 is a configuration diagram showing an example of a multiple dwelling house interphone system according to the disclosure. Reference character 1 denotes a centralized collective entrance machine which is provided to a central entrance of a multiple dwelling house constituted of a plurality of buildings and is for a visitor to call a dweller of any building and speak with the dweller. Reference character 2 denotes a building collective entrance machine which is provided to each building and is for calling a dweller in the building and speaking with the dweller. Reference character 3 denotes a dwelling unit master device which is provided to each dwelling unit and is for responding to a call and speaking. Reference character 4 denotes a centralized controller for controlling communication between the centralized collective entrance machine 1 and each dwelling unit master device 3. Reference character 5 denotes a building controller which controls communication between the building collective entrance machine 2 and each dwelling unit master device 3. Reference character 6 denotes a centralized management room master device provided to a management room. In addition, reference character L1 denotes a LAN wiring and the above devices are connected via the LAN.

Here, a case where the building collective entrance machines 2 are provided to respective floors in each building, is shown. Normally, one or more building collective entrance machines 2 are provided for each building. The centralized collective entrance machine 1 is provided at the central entrance or the like, and at least one centralized collective entrance machine 1 is provided in the entire multiple dwelling house. In addition, in the multiple dwelling house interphone system, an electric lock for an automatic door provided at the entrance, entrance slave devices provided at the individual dwelling unit entrances and used for calling operations for dwellers, a speech device provided in an elevator, a monitoring camera provided in a common area, and the like are connected, but these are not shown. In addition, access control is provided at an appropriate part on the LAN wiring L1, but is not shown.

Figure 2:
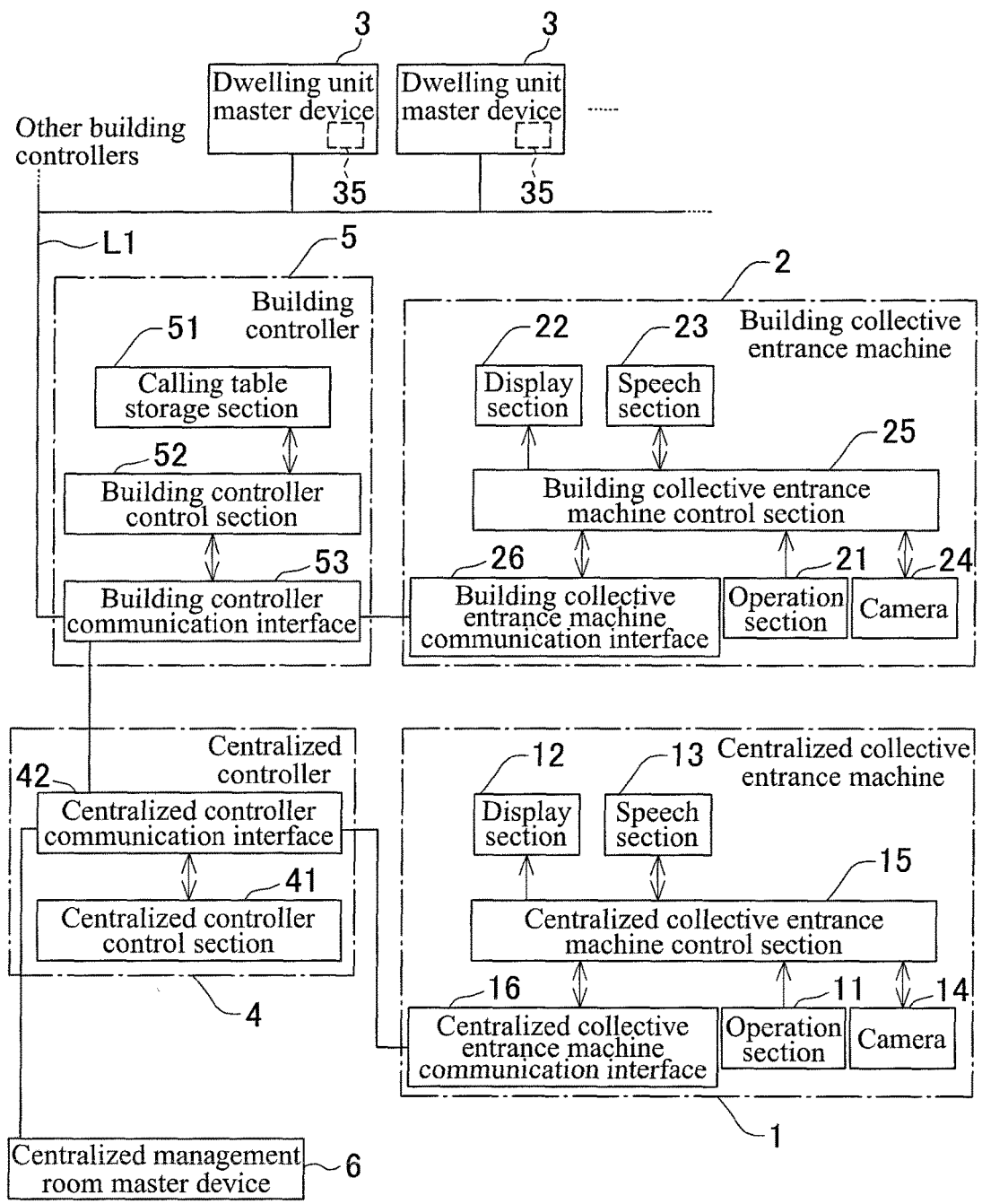
FIG. 2 is a configuration diagram showing a major part in FIG. 1 by a block diagram.

FIG. 2 is a block diagram showing major devices in FIG. 1. As shown in FIG. 2, the centralized collective entrance machine 1 includes an operation section 11 for inputting ID information or the like for selecting a calling destination dwelling unit, a display section 12 which performs display of an input number and the like, a speech section 13 having a microphone and a speaker which are not shown, a camera 14 for imaging a visitor, a centralized collective entrance machine control section 15 which includes a CPU and controls the centralized collective entrance machine 1, a centralized collective entrance machine communication interface 16 for communicating with the centralized controller 4, and the like.

Each building collective entrance machine 2 includes an operation section 21 for inputting a dwelling unit number, etc., for selecting a calling destination dwelling unit, a display section 22 which performs display of an input number and the like, a speech section 23 having a microphone and a speaker which are not shown, a camera 24 for imaging a visitor, a building collective entrance machine control section 25 which includes a CPU and controls the building collective entrance machine 2, a building collective entrance machine communication interface 26 for communicating with the building controller 5, and the like.

The centralized controller 4 includes a centralized controller control section 41 which includes a CPU and controls communication between the centralized collective entrance machine 1 and each dwelling unit master device 3, etc., a centralized controller communication interface 42 for communicating with the centralized collective entrance machine 1, each building controller 5, each dwelling unit master device 3, etc., and the like.

Each building controller 5 includes a calling table storage section 51 storing a calling table in which dwelling unit master device IDs and dwelling unit numbers of calling destination dwelling units are associated with each other, a building controller control section 52 which includes a CPU and controls communication between the building collective entrance machine 2 and each dwelling unit master device 3, etc., a building controller communication interface 53 for communicating with the building collective entrance machine 2, each dwelling unit master device 3, the centralized controller 4, etc., and the like.

Each dwelling unit master device 3 includes, as shown in FIG. 1, a handset 31 for responding to a call, a monitor 32 for displaying a video image taken by the camera 14 of the centralized collective entrance machine 1 or the camera 24 of the building collective entrance machine 2, an operation section 33 for performing various setting operations, a speech button 34 for receiving a call and responding thereto, and the like. In addition, reference character 35 shown in FIG. 2 denotes an ID storage section storing its own ID.

Operation of the multiple dwelling house interphone system configured as described above is as follows. First, a case where a calling operation is performed on the centralized collective entrance machine 1 will be described.

On the centralized collective entrance machine 1, the ID set and stored in each dwelling unit master device 3 is inputted, whereby calling is performed. For example, in a case where the ID is set as a combination of a building number and a dwelling unit number, calling is performed by input of the building number and the dwelling unit number, as in the conventional operation. In this case, assuming that room 501 in building 1 is to be called, the operation section 11 is operated to input "1501" and a call button (not shown) is pressed, whereby a calling operation is performed. Thus, the centralized collective entrance machine control section 15 transmits an ID confirmation request signal, and the ID confirmation request signal is transmitted to all the dwelling unit master devices 3 of all the buildings via the centralized controller 4 and the building controllers 5.

It is noted that the ID registered in each dwelling unit master device 3 may be, for example, a random number string irrelevant to the dwelling unit number. However, in that case, a visitor needs to know the set ID in advance or at the time of a calling operation.

Each dwelling unit master device 3 that has received the ID confirmation request signal performs comparison with its own ID information stored in the ID storage section 35, and then, when the ID is different, the dwelling unit master device 3 ignores the ID confirmation request signal, and when the ID is matched, the dwelling unit master device 3 replies to the centralized collective entrance machine 1 that the ID is matched.

The reply signal is returned via the building controller 5 and the centralized controller 4, and when the centralized collective entrance machine 1 has received the reply signal, the centralized collective entrance machine control section 15 generates a call signal and transmits the call signal to the dwelling unit master device 3 that has transmitted the reply signal. Thus, the dwelling unit master device 3 that has received the call signal emits a call sound, and the centralized collective entrance machine 1 emits a call confirmation sound.

In response to this sound emission, when the dweller performs a response operation of pressing the speech button 34 of the dwelling unit master device 3, a speech path is generated between the dwelling unit master device 3 and the centralized collective entrance machine 1, so that the visitor and the dweller are allowed to speak with each other.

It is noted that, along with the transmission of the call signal, the centralized collective entrance machine control section 15 activates the camera 14 and transmits the taken video image to the dwelling unit master device 3, and thus, in the dwelling unit master device 3, the transmitted video image is displayed on the monitor 32.

It is noted that the building controller 5 relaying the ID confirmation request signal and the call signal performs the following control in accordance with the condition of the speech path. When the corresponding dwelling unit master device 3 replies in response to the ID confirmation request signal transmitted from the centralized collective entrance machine 1, in the case where another device is using a speech path and thus there is no speech path available, the building controller control section 52 of the building controller 5 that manages the dwelling unit master device 3 returns a master device recognition signal for only notifying that the target dwelling unit master device 3 exists, without relaying the reply signal from the dwelling unit master device 3.

In the centralized collective entrance machine 1 that has received the master device recognition signal, the centralized collective entrance machine control section 15 performs control so that a call signal is not transmitted and also, the centralized collective entrance machine 1 itself does not emit a call confirmation sound. Instead, the visitor is notified that calling is impossible at present, by means of a predetermined display on the display section 12, an announcement, or the like.

When the building controller control section 52 relays a call signal transmitted from the centralized collective entrance machine 1, in the case where the dwelling unit master device 3 at the calling destination is busy with another device, the building controller control section 52 stops relay of the call signal and returns a busy signal for notification of the busy state to the centralized collective entrance machine 1.

The centralized collective entrance machine control section 15 that has received the busy signal notifies the visitor of the busy state by means of a predetermined display on the display section 12, an announcement, or the like without emitting a call confirmation sound.

As described above, calling for a visit destination dweller is performed by input of the ID of the dwelling unit master device 3 from the centralized collective entrance machine 1. Therefore, it becomes unnecessary to provide, to the centralized collective entrance machine 1 or the centralized controller 4, a calling table in which the dwelling unit master devices are associated with the building numbers and the dwelling unit numbers. Thus, it becomes unnecessary to provide a large-scale ROM or a high-function CPU.

In addition, even when the ID confirmation request signal has been successfully transmitted to the dwelling unit master device 3 to be called, in the case where there is no speech path available, the centralized collective entrance machine 1 can notify the visitor that the dweller to be called cannot be called at present. Therefore, the visitor can avoid becoming anxious even if the dweller cannot be called.

Further, when the dwelling unit master device 3 to which the call signal is transmitted is busy, it is possible to recognize this fact via the centralized collective entrance machine 1. Therefore, the visitor can grasp the situation and thus can avoid becoming anxious.

Next, a case where a calling operation is performed on the building collective entrance machine 2 will be described. Since the building controller 5 has the calling table storage section 51 as described above, a calling operation is performed by input of a dwelling unit number on the building collective entrance machine 2, and thus calling can be performed through a conventional operation. In response to the input of the dwelling unit number, the building controller control section 52 refers to the calling table to recognize the ID of the dwelling unit master device 3, and transmits a call signal to the corresponding dwelling unit master device 3. The call signal is transmitted to the dwelling unit master device 3 via the building controller 5, and the dwelling unit master device 3 that has received the call signal emits a call sound. A subsequent speech operation is the same as in generation of a speech path with the centralized collective entrance machine 1 as described above. It is noted that, also in this case, along with the transmission of the call signal, a video image taken by the camera 24 is transmitted and is displayed on the monitor 32.

In this way, calling is performed through a conventional calling operation of inputting a dwelling unit number from the building collective entrance machine 2, which ensures calling through a simple operation.

In the above embodiment, the centralized collective entrance machine 1 is provided at a specific location such as the central entrance so as to enable calling for a dweller of any building, while the building collective entrance machine 2 is provided for each building so as to enable calling within the corresponding building. However, without providing the building collective entrance machines 2, all the collective entrance machines are implemented as the centralized collective entrance machine 1. In this case, the calling table storage section 51 is not needed.

Although the calling table storage section 51 is provided to the building controller 5, the calling table storage section 51 may be provided to the building collective entrance machine 2.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A multiple dwelling house interphone system comprising:
    a centralized collective entrance machine provided for a visitor to call a dweller of any building in a multiple dwelling house constituted of a plurality of buildings;
    a dwelling unit master device provided to each of dwelling units for a dweller to respond to a call from the centralized collective entrance machine; and
    a centralized controller configured to control communication between the centralized collective entrance machine and each dwelling unit master device, wherein
    each dwelling unit master device stores an own ID, and
    the centralized collective entrance machine includes a calling control section configured to, when an operation of inputting the ID is performed for calling a dweller, first transmit an ID confirmation request signal to all the dwelling unit master devices and wait for a reply from the corresponding dwelling unit master device, and then, transmit a call signal to the dwelling unit master device that has replied, to perform calling, wherein
    at an entrance of each building of the multiple dwelling house, a building collective entrance machine for calling a dweller in the building is provided, and a building controller configured to control communication between the building collective entrance machine and each dwelling unit master device is provided,
    the building collective entrance machine or the building controller has a calling table in which the IDs and dwelling unit numbers of the dwelling unit master devices are associated with each other, and the building collective entrance machine allows calling to be performed by input of each dwelling unit number, and
    the building controller has a speech path monitoring section configured to monitor the ID confirmation request signal transmitted from the centralized collective entrance machine, and when the dwelling unit master device having the corresponding ID exists in the building that the building controller manages, and a corresponding speech path is in use, the speech path monitoring section notifies the centralized collective entrance machine that the dwelling unit to be called exists.

2. The multiple dwelling house interphone system according to claim 1, wherein
    the building controller has a dwelling unit master device monitoring section configured to monitor the call signal transmitted from the centralized collective entrance machine, and even when a dwelling unit number of a calling destination exists in the building that the building controller manages, in the case where the dwelling unit master device to be called is in a busy state, the dwelling unit master device monitoring section notifies the centralized collective entrance machine of the busy state, and
    the calling control section of the centralized collective entrance machine notified of the busy state performs report of the busy state.

3. A multiple dwelling house interphone system comprising:
    a centralized collective entrance machine provided for a visitor to call a dweller of any building in a multiple dwelling house constituted of a plurality of buildings;
    a dwelling unit master device provided to each of dwelling units for a dweller to respond to a call from the centralized collective entrance machine; and
    a centralized controller configured to control communication between the centralized collective entrance machine and each dwelling unit master device, wherein
    each dwelling unit master device stores an own ID, and
    the centralized collective entrance machine includes a calling control section configured to, when an operation of inputting the ID is performed for calling a dweller, first transmit an ID confirmation request signal to all the dwelling unit master devices and wait for a reply from the corresponding dwelling unit master device, and then, transmit a call signal to the dwelling unit master device that has replied, to perform calling, wherein
    at an entrance of each building of the multiple dwelling house, a building collective entrance machine for calling a dweller in the building is provided, and a building controller configured to control communication between the building collective entrance machine and each dwelling unit master device is provided,
    the building collective entrance machine or the building controller has a calling table in which the IDs and dwelling unit numbers of the dwelling unit master devices are associated with each other, and the building collective entrance machine allows calling to be performed by input of each dwelling unit number,
    the building controller has a dwelling unit master device monitoring section configured to monitor the call signal transmitted from the centralized collective entrance machine, and even when a dwelling unit number of a calling destination exists in the building that the building controller manages, in the case where the dwelling unit master device to be called is in a busy state, the dwelling unit master device monitoring section notifies the centralized collective entrance machine of the busy state, and the calling control section of the centralized collective entrance machine notified of the busy state performs report of the busy state.

\* \* \* \* \*